R. A. SORENSON.
APPARATUS FOR MEASURING GARMENTS.
APPLICATION FILED JUNE 2, 1914.
1,261,452.
Patented Apr. 2, 1918.
3 SHEETS—SHEET 1.
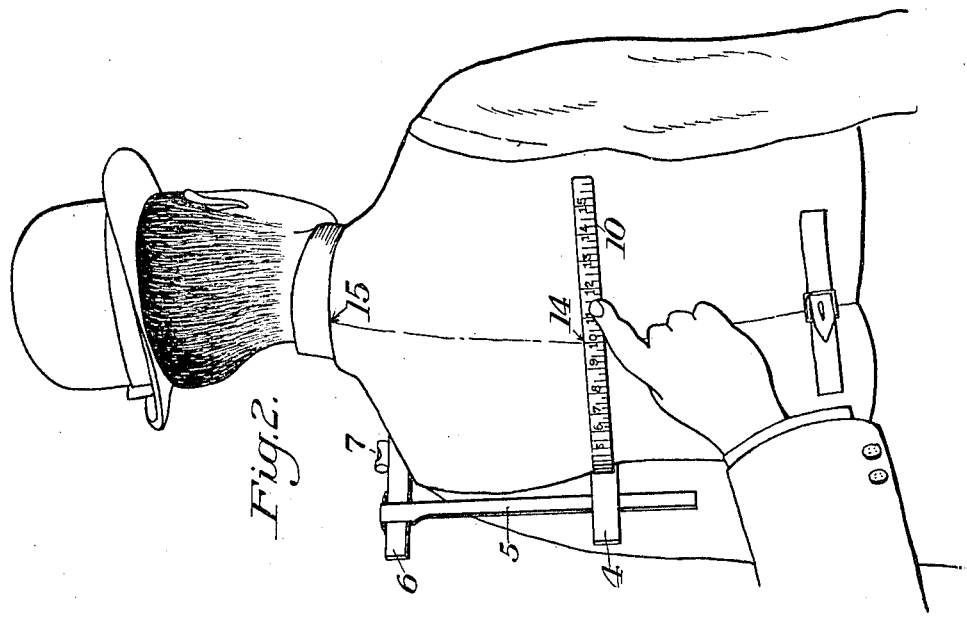
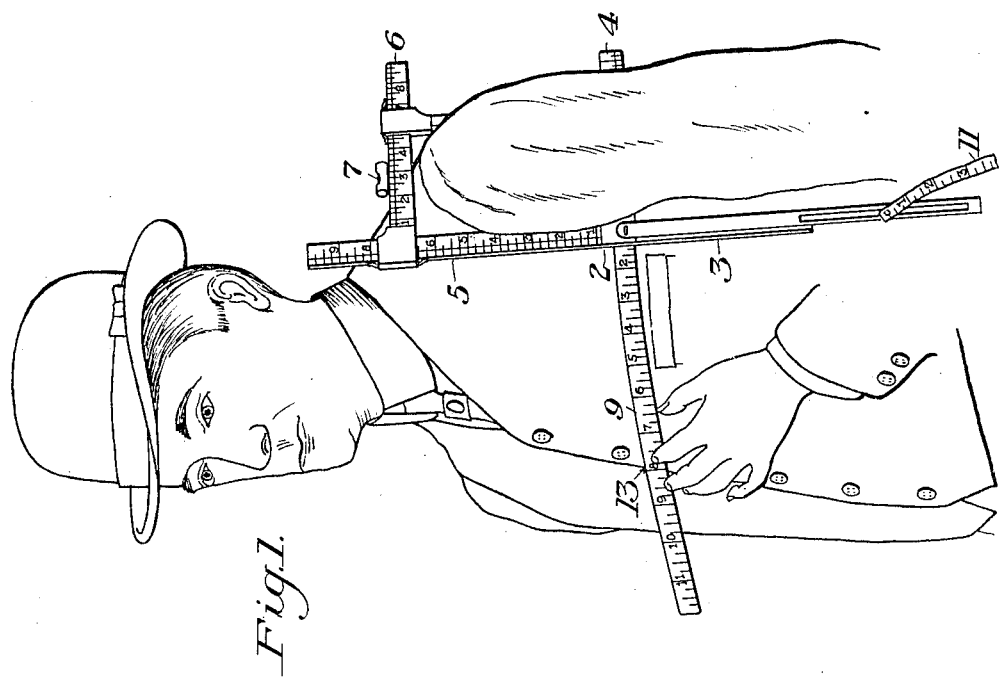
WITNESSES
INVENTOR
R. A. Sorenson,

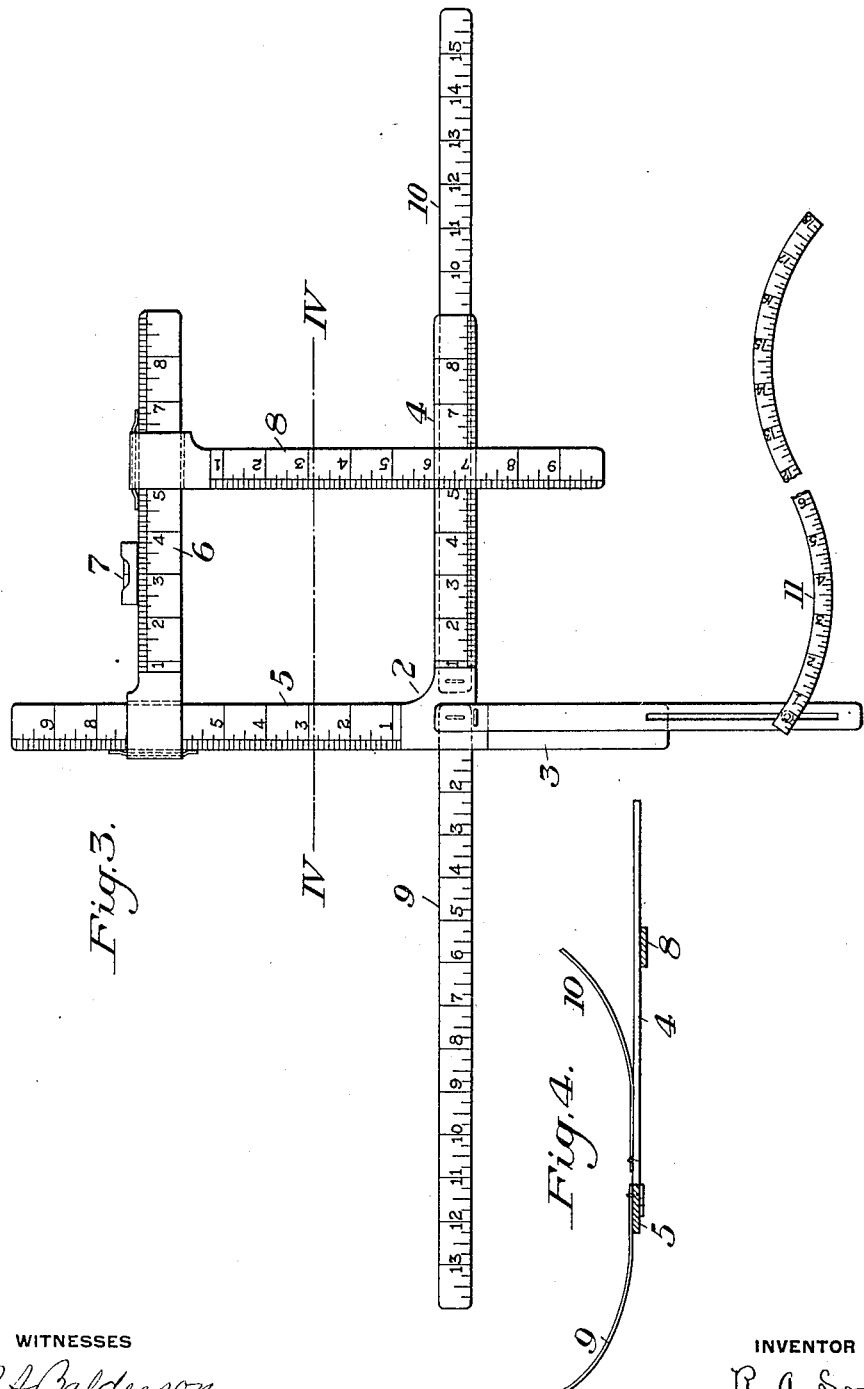

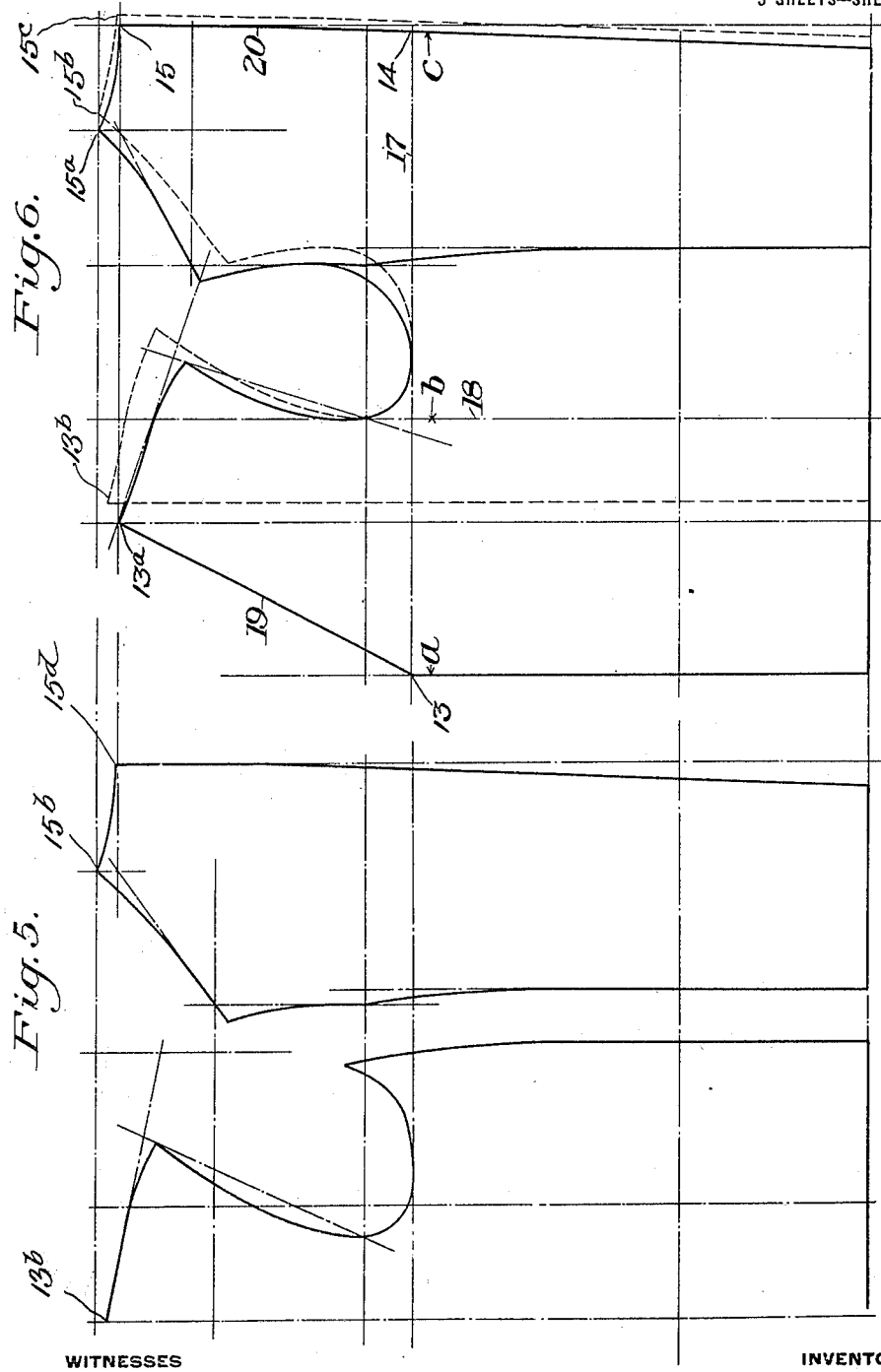

UNITED STATES PATENT OFFICE.

RASMUS A. SORENSON, OF PITTSBURGH, PENNSYLVANIA.

APPARATUS FOR MEASURING GARMENTS.

1,261,452.  Specification of Letters Patent.  Patented Apr. 2, 1918.

Application filed June 2, 1914. Serial No. 842,402.

*To all whom it may concern:*

Be it known that I, RASMUS A. SORENSON, a citizen of the United States, residing at Pittsburgh, in the county of Allegheny and State of Pennsylvania, have invented a new and useful Apparatus for Measuring Garments; of which the following is a full, clear, and exact description, reference being had to the accompanying drawings, forming part of this specification, in which—

Figure 1 is a perspective view showing the device in use.

Fig. 2 is a similar view from the opposite direction.

Fig. 3 is a side elevation of the measuring device.

Fig. 4 is a detail sectional view on the line IV—IV of Fig. 3.

Fig. 5 is a diagram of a pattern cut in accordance with one of the old methods, and Fig. 6 is a diagram showing a pattern in full lines cut in accordance with my method, and showing a pattern in dotted lines for the same person cut in accordance with the diagram shown in Fig. 5.

This invention relates to an apparatus for measuring coats, or the like, whereby absolute measurements can be taken of the person to be fitted irrespective of his natural pose or deformities.

By the old methods the chest measurement was subdivided in accordance with mathematical rules, so that the measurements from the seams of the coat at the side to the center of the front, as well as from said seams to the center of the back were absolutely fixed by calculation, so that there was no account taken as to whether the person was full chested or stooped. It will readily be understood by those familiar with the art that if a person is stooped and hollow chested a greater amount of cloth will be required in the back than would be required in the back of a coat for a man having the same chest measurement who was erect and straight and full chested.

The object of my invention is to obtain absolute measurements from the armhole to the center of the back, and from the armhole to the center of the front of the garment, so as to absolutely determine the amount of cloth to be placed in the back and the front of the garment. I accomplish this by utilizing a measuring device which is placed over the arm of the person to be measured, and which is then lined up so that the vertical portions thereof will extend in an absolute vertical line, irrespective of the pose of the party being measured. After the instrument has been properly adjusted, I obtain a point at the center of the garment at the front on an absolute horizontal line with the bottom of the armhole, and take the measurement from the side seam of the coat to the center of the front. I also get the same measurement for the back of the garment, and then take the measurement from the center of the collar at the back to the center of the back on a line with the bottom of the armhole, and also obtain this same measurement from the center of the collar to the center of the garment at the front, which is on a line with the bottom of the armhole. By this means I am enabled to accurately measure the size of the armhole, accurately place the seams at the sides of the garment so that the said seams will be vertical irrespective of the pose of the wearer of the garment, and at the same time absolutely measure the amount of cloth to be placed in the front and also that to be placed in the back of the garment.

Referring to the accompanying drawings, the reference character 2 designates a square having a downwardly extending arm 3, a laterally extending arm 4, and an upwardly extending arm 5, the arms 4 and 5 being graduated. Slidably mounted upon the arm 5 is a horizontal member 6 having a spirit level 7 mounted on the upper edge thereof, and slidably mounted on the arm 6 is a vertical member 8 which extends downwardly over the arm 4 of the square 2. These two sliding members are also graduated so that the size of the armhole can readily be ascertained by the graduations on the various members. Connected to the square 2 is a flexible metallic tape member 9 extending in one direction therefrom and at right angles to the member 5, and extending in the opposite direction is a similar tape 10. These members 9 and 10 are connected to the square by means of rivets so that they will always extend in lines at right angles to the arms 3 and 5. Connected to the downwardly extending member 3 of the square by means of a headed pin slidably mounted in a slot in the member 3 is a tape 11 which can be used for various measurements.

In order to take the measurement of a person the device is placed over the arm of the person as indicated in Figs. 1 and 2, and the members 6 and 8 are properly adjusted in order to obtain the size of the armhole. The square is then leveled so that the upper member 6 lies in a horizontal plane and the members 3 and 5 in a vertical plane, it being supposed that the person to be measured is standing in his natural position. The member 9 is then drawn about the chest of the party being measured, and a point indicated at the center of the front, as at 13. A similar measurement is then taken across the back at a point indicated at the center of the back, as at 14. It will be noted that these two measurements aggregate eighteen inches, which shows that the chest measurement of this party is thirty-six inches. After these measurements have been taken, a measurement is taken from the point 15 at the back to the point 14, giving the length of the back from the center of the collar to a point on the center of the back in a horizontal plane with the bottom of the armhole. A similar measurement is then taken from the point 13 to the point 15 for the front of the garment. After the various measurements have been taken a chart is laid out in accordance with the full lines shown in Fig. 6 in which the distance $a$ to $b$ indicates the front measurement, while the distance from $b$ to $c$ indicates the rear measurement, from the front edge of the armhole. The measurements taken from the point 14 to the center of the back of the collar marked 15, and from the point 13 to the same point 15 are laid out on the chart shown in Fig. 6. The measurement from the point 14 to 15 is laid out on a line perpendicular to the line 17, this giving the point 15 on the chart. The back of the collar is then laid out from the point 15 to the point $15^a$, in accordance with the well established method. The length of the line from $15^a$ to 15 is then subtracted from the measurement from the point 13 to the point 15, the remainder giving the length of the line from 13 to $13^a$, the point $13^a$ being laid out on a line which is parallel with the line 17 and spaced therefrom a distance equal to the measurement from the point 14 to 15. If the party is stooped the line 19 on Fig. 6 would be very much shortened, while the line 20 would be increased, and if he were full chested and erect the length of the line 20 from the line 17 would be shortened and the line 19 increased in length.

In Fig. 5 of the drawings, I have shown a portion of a pattern laid out in accordance with an old and well known method and in which the same measurements were used which were used for laying out the pattern in full lines in Fig. 6. In this pattern in Fig. 5, the point $15^d$ is the same point in the pattern as the point 15 in Fig. 6, while points $15^b$ and $13^b$ are the same as similar points $15^a$ and $13^a$, respectively, on Fig. 6. The dotted pattern on Fig. 6, which is the same as the full line pattern in Fig. 5 has also been lettered in accordance with Fig. 5.

The advantages of my invention result from the provision of an apparatus whereby the exact measurement can be obtained in a horizontal direction from the side seam to the center of the front on a horizontal plane and from the side seam to the center of the back on the same plane irrespective of the pose or deformity of the party being measured. Further, from the provision of an apparatus having two squares connected in such a manner that the members of one square are adjusted relative to the other member to indicate the size of the arm hole and which are placed in vertical and horizontal planes, together with flexible metallic scale members connected to one of the squares and extending parallel to the horizontal member of the square, so that an absolutely vertical line can be obtained along the side seam of the garment, and from which actual measurements can be made to base points at the center of the back and center of the front in the same horizontal plane, and from which base points the other measurements of the garment can readily be taken.

I claim:

1. Apparatus for measuring garments, comprising a square having fixed members, a second square having members movable relative to each other and relative to the members of the other square, means for supporting the members of the second square on the first square, and a plurality of spring-like scale members fixedly connected to the fixed square at a point adjacent to the junction of the square members and extending in opposite directions, said flexible members being sufficiently rigid to maintain the edges thereof in planes parallel to the planes of the edges of the horizontal member of the first square, substantially as described.

2. Apparatus for measuring garments, comprising a square having members fixed relative to each other, a second square having members movable relative to each other and relative to the members of the fixed square, means for slidingly connecting one of the members of the second square to one of the members of the first square, means for slidably connecting one member of the second square on the other member thereof, means for indicating when one of the members of each of the squares is in a horizontal plane, and a plurality of flexible members fixedly connected to the first square and extending in opposite directions, said flexible members being sufficiently rigid to maintain the edges thereof in planes parallel to the planes of the edges of the horizontal member of the first square, substantially as described.

In testimony whereof, I have hereunto set my hand.

RASMUS A. SORENSON.

Witnesses:
W. C. LYON,
H. M. CORWIN.

Copies of this patent may be obtained for five cents each, by addressing the "Commissioner of Patents, Washington, D. C."